(12) United States Patent
Cohen et al.

(10) Patent No.: US 9,709,363 B2
(45) Date of Patent: Jul. 18, 2017

(54) ARMOR SYSTEM

(71) Applicant: Edan Administration Services (Ireland) Limited, Dublin (IE)

(72) Inventors: Hananya Cohen, New York, NY (US); Edwin Cohen, Antwerp (BE)

(73) Assignee: Edan Administration Services (Ireland) Limited, Dublin (IE)

( * ) Notice: Subject to any disclaimer, the term of this patent is extended or adjusted under 35 U.S.C. 154(b) by 0 days.

(21) Appl. No.: 14/428,999

(22) PCT Filed: Sep. 23, 2013

(86) PCT No.: PCT/IB2013/058756
§ 371 (c)(1),
(2) Date: Mar. 18, 2015

(87) PCT Pub. No.: WO2014/045248
PCT Pub. Date: Mar. 27, 2014

(65) Prior Publication Data
US 2015/0219424 A1 Aug. 6, 2015

Related U.S. Application Data

(60) Provisional application No. 61/704,502, filed on Sep. 23, 2012.

(51) Int. Cl.
| | |
|---|---|
| *F41H 5/00* | (2006.01) |
| *F41H 5/04* | (2006.01) |
| *B63B 3/10* | (2006.01) |
| *B64D 7/00* | (2006.01) |
| *F41H 1/02* | (2006.01) |

(Continued)

(52) U.S. Cl.
CPC ............. *F41H 5/0428* (2013.01); *B63B 3/10* (2013.01); *B64D 7/00* (2013.01); *F41H 1/02* (2013.01); *F41H 5/0421* (2013.01); *F41H 5/0492* (2013.01); *F41H 5/24* (2013.01); *F41H 7/02* (2013.01)

(58) Field of Classification Search
USPC ........... 89/36.01, 36.02, 36.05, 36.07, 36.08, 89/36.09
See application file for complete search history.

(56) References Cited

U.S. PATENT DOCUMENTS

| | | |
|---|---|---|
| 1,894,605 A | 1/1933 | Wright |
| 4,061,815 A | 12/1977 | Poole, Jr. |
| 4,483,020 A | 11/1984 | Dunn |

(Continued)

FOREIGN PATENT DOCUMENTS

| | | |
|---|---|---|
| EP | 1190647 | 3/2002 |
| EP | 2284474 | 2/2011 |

(Continued)

OTHER PUBLICATIONS

Official Action Dated Oct. 9, 2015 From the US Patent and Trademark Office Re. U.S. Appl. No. 13/440,033.

(Continued)

*Primary Examiner* — J. Woodrow Eldred (57) ABSTRACT

An armor system pellet is provided. The pellet includes a pellet body attached to four projections for interlocking adjacent pellets when arranged in an array. The pellet is configured such that the width of a first pair of co-linear projections is less than a width of a second pair of co-linear projections.

31 Claims, 3 Drawing Sheets

(51) Int. Cl.
*F41H 5/24* (2006.01)
*F41H 7/02* (2006.01)

(56) References Cited

U.S. PATENT DOCUMENTS

| | | | |
|---|---|---|---|
| 4,529,640 | A | 7/1985 | Brown et al. |
| 4,836,084 | A | 6/1989 | Vogelesang et al. |
| 4,868,040 | A | 9/1989 | Hallal et al. |
| 5,705,764 | A | 1/1998 | Schade et al. |
| 5,763,813 | A | 6/1998 | Cohen et al. |
| 5,804,757 | A | 9/1998 | Wynne |
| 5,972,819 | A | 10/1999 | Cohen |
| 6,112,635 | A | 9/2000 | Cohen |
| 6,203,908 | B1 | 3/2001 | Cohen |
| 6,289,781 | B1 | 9/2001 | Cohen |
| 6,408,734 | B1 | 6/2002 | Cohen |
| 6,500,507 | B1 | 12/2002 | Fisher |
| 6,575,075 | B2 | 6/2003 | Cohen |
| 6,807,891 | B2 | 10/2004 | Fisher |
| 7,807,247 | B1 | 10/2010 | Bromley et al. |
| 8,291,808 | B2 | 10/2012 | Howland |
| 2005/0015837 | A1 | 1/2005 | Saito |
| 2006/0243127 | A1 | 11/2006 | Cohen |
| 2007/0017359 | A1 | 1/2007 | Gamache et al. |
| 2007/0089597 | A1 | 4/2007 | Ma |
| 2007/0137471 | A1 | 6/2007 | Mazur |
| 2009/0078109 | A1 | 3/2009 | Baxter et al. |
| 2010/0101402 | A1 | 4/2010 | Ma |
| 2011/0239849 | A1 | 10/2011 | Neal et al. |
| 2012/0090453 | A1 | 4/2012 | Cohen |
| 2012/0137864 | A1 | 6/2012 | Ortiz et al. |
| 2012/0186434 | A1 | 7/2012 | Cohen |
| 2012/0240758 | A1 | 9/2012 | Cohen |

FOREIGN PATENT DOCUMENTS

| | | |
|---|---|---|
| GB | 1081464 | 8/1967 |
| GB | 1352418 | 5/1974 |
| GB | 2272272 | 5/1994 |
| WO | WO 93/21492 | 10/1993 |
| WO | WO 94/24894 | 11/1994 |
| WO | WO 98/15796 | 4/1998 |
| WO | WO 02/41719 | 5/2002 |
| WO | WO 2009/095903 | 8/2009 |
| WO | WO 2012/146995 | 11/2012 |
| WO | WO 2014/045248 | 3/2014 |

OTHER PUBLICATIONS

Notice of Allowance Dated Jan. 21, 2016 From the US Patent and Trademark Office Re. U.S. Appl. No. 13/440,033.
Advisory Action Before the Filing of an Appeal Brief Dated Apr. 15, 2014 From the US Patent and Trademark Office Re. U.S. Appl. No. 13/440,033.
Communication Pursuant to Rules 70(2) and 70a(2) EPC Dated Sep. 16, 2014 From the European Patent Office Re. Application No. 12776430.6.
International Preliminary Report on Patentability Dated Apr. 2, 2015 From the International Bureau of WIPO Re. Application No. PCT/IB2013/058756.
International Preliminary Report on Patentability Dated Nov. 7, 2013 From the International Bureau of WIPO Re. Application No. PCT/IB2012/051697.
International Search Report and the Written Opinion Dated Jan. 16, 2014 From the International Searching Authority Re. Application No. PCT/IB2013/058756.
International Search Report and the Written Opinion Dated Sep. 18, 2012 From the International Searching Authority Re. Application No. PCT/IB2012/051697.
Notice of Allowance Dated Nov. 7, 2012 From the US Patent and Trademark Office Re. U.S. Appl. No. 13/094,851.
Official Action Dated Jan. 2, 2013 From the US Patent and Trademark Office Re. U.S. Appl. No. 13/440,033.
Official Action Dated Jun. 3, 2014 From the US Patent and Trademark Office Re. U.S. Appl. No. 13/440,033.
Official Action Dated Nov. 6, 2014 From the US Patent and Trademark Office Re. U.S. Appl. No. 13/440,033.
Official Action Dated Jul. 15, 2015 From the US Patent and Trademark Office Re. U.S. Appl. No. 13/440,033.
Official Action Dated Nov. 19, 2012 From the US Patent and Trademark Office Re. U.S. Appl. No. 12/903,258.
Official Action Dated Feb. 26, 2015 From the US Patent and Trademark Office Re. U.S. Appl. No. 13/440,033.
Official Action Dated Aug. 28, 2013 From the US Patent and Trademark Office Re. U.S. Appl. No. 13/440,033.
Supplementary European Search Report and the European Search Opinion Dated Aug. 29, 2014 From the European Patent Office Re. Application No. 12776430.6.
Communication Pursuant to Article 94(3) EPC Dated Nov. 7, 2016 From the European Patent Office Re. Application No. 13785929.4. (6 Pages).
Communication Pursuant to Article 94(3) EPC Dated Nov. 21, 2016 From the European Patent Office Re. Application No. 12776430.6. (7 Pages).

ARMOR SYSTEM

RELATED APPLICATIONS

This application is a National Phase of PCT Patent Application No. PCT/IB2013/058756 having International filing date of Sep. 23, 2013, which claims the benefit of priority under 35 USC §119(e) of U.S. Provisional Patent Application No. 61/704,502 filed on Sep. 23, 2012. The contents of the above applications are all incorporated by reference as if fully set forth herein in their entirety.

FIELD AND BACKGROUND OF THE INVENTION

The present invention relates to an armor system and, more particularly, to a ballistic armor system that includes an array of interlocked cross-shaped pellets having projections of variable width.

Although present day armor systems can provide greater protection, there is oftentimes a tradeoff between protection and mobility due to the weight, bulk of armor systems and cost. Furthermore, munitions are continually being invented to eliminate the effectiveness of the armor.

The weight and bulk of an armor system tends to be more critical in personal armor (e.g. helmets and body armor). In such cases, advances have led to use of composite materials in order to increase mobility and decrease weight while increasing the degree of protection. For example, military helmets have evolved from the steel helmets of World Wars I and II, to plastic helmets, to the current state-of-the-art composite helmets which include aramid fibers capable of stopping handgun rounds but incapable of stopping larger projectiles.

Modern body armor (e.g. the bulletproof or ballistic vest) has also evolved from the cotton and nylon vests of the early 20th century to the fiber reinforced plastics of 1950-70s to the Kevlar and ceramic/metal plate armor of present day.

Ceramic materials have long been considered for use in the fabrication of armor components due to their hardness and relative lightweight. However, the use of ceramic materials in armor has been limited by cost, weight and limited repeat hit capability due to the brittleness of the material. In addition, the use of ceramic material severely limits armor reparability following projectile hit. Armor-grade ceramics can be extremely hard, brittle materials, and thus following impact of sufficient energy, a monolithic ceramic plate will fracture extensively, leaving many smaller pieces and a reduced ability to protect against subsequent hits. Thus, multiple hits can be a serious problem with ceramic-based armors.

In order to traverse these limitations of ceramics, current integral armor designs typically utilize arrays of ballistic grade ceramic tiles within an encasement of polymer composite plating. Such an armor system will erode and shatter projectiles, including armor-piercing projectiles, thus creating effective protection at a somewhat reduced weight.

Ceramic, metal (e.g., steel or titanium), or polyethylene plate armor systems have recently seen military use, and have demonstrated varying degrees of protection against projectile threats. Although effective, these body armor systems have been criticized for imposing weight and mobility constraints on the user while being expensive to mass-produce.

Thus, there is a continuing and ongoing need to provide improved ballistic protection with a minimal mobility and weight penalty.

SUMMARY OF THE INVENTION

According to one aspect of the present invention there is provided an armor system pellet comprising a pellet having a pellet body attached to four projections for interlocking adjacent pellets when arranged in an array, wherein a width of a first pair of co-linear projections is less than a width of a second pair of co-linear projections.

According to further features in preferred embodiments of the invention described below, each projection of the first pair of co-linear projections is capable of contacting four projections of adjacent pellets when arranged in an array.

According to still further features in the described preferred embodiments each projection of the second pair of co-linear projections is capable of contacting three projections of adjacent pellets when arranged in an array.

According to still further features in the described preferred embodiments the pellet is cross-shaped.

According to still further features in the described preferred embodiments the armor system pellet is composed of a ceramic material.

According to still further features in the described preferred embodiments the ceramic material includes a material selected from the group consisting of alumina, boron carbide, boron nitride, silicon carbide, silicon nitride, and zirconium oxide.

According to still further features in the described preferred embodiments the front and/or back surface of the pellet is convex.

According to still further features in the described preferred embodiments the front and/or back surface of the projections is convex.

According to still further features in the described preferred embodiments a largest diameter of the pellet exceeds a largest height thereof.

According to another aspect of the present invention there is provided an armor system comprising an array of the pellets described herein.

According to still further features in the described preferred embodiments the armor system further comprises front and/or back plates sandwiching the array.

According to still further features in the described preferred embodiments the armor system further comprises a polymer resin disposed within the array and/or between the array and the front and/or back plates.

According to still further features in the described preferred embodiments the armor system further comprises a flexible support structure for securing the array to the front and/or back plates.

According to still further features in the described preferred embodiments the armor system further comprises connectors for interconnecting the front and back plates through the support structure.

According to still further features in the described preferred embodiments the armor system further comprises a shock absorbing layer disposed between the front and back plates.

According to still further features in the described preferred embodiments the armor system comprises one or more array layers.

According to still further features in the described preferred embodiments the armor system further comprises a high tensile strength fabric disposed around the array.

According to still further features in the described preferred embodiments the fabric includes carbon fibers, fiberglass fibers, aramid fibers and/or metallic fibers.

According to still further features in the described preferred embodiments the armor system is incorporated into body armor.

According to still further features in the described preferred embodiments the armor system is incorporated into an armor panel of a vehicle, airplane or boat or facility.

The present invention successfully addresses the shortcomings of the presently known configurations by providing an armor system that provides superior protection against projectiles and shrapnel while being lighter weight, modular, configurable for use on a variety of surfaces.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE SEVERAL VIEWS OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of an armor system which can be used to provide a high degree of protection from projectiles or shrapnel while achieving reduced constraints on weight and mobility.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Protective armor for heavy and mobile military equipment, such as tanks is typically heavy but provides good protection against explosives and projectiles. With the ever-increasing advancements in threat levels, protective requirements need to be augmented. Heavy vehicles accomplish this at great expense to suspension and transmissions loads. In relatively lighter vehicles (cars, jeeps), airplanes and boats as well as personnel, such armor material adds significant weight and bulk (each millimeter of a steel panel adds a weight factor of 7.8 kg/m$^2$) adding significant stress on the vehicle or personnel which severely compromises mobility and performance.

Due to these limitations, state of the art armor systems used in protection of light vehicles and personnel provide less than desired protection.

In order to provide effective protection while minimizing negative effects on mobility, the configuration of the armor plates used in the armor system must maximize protection and mobility while minimizing weight.

An armor system incorporating an array of interlocked pellets was previously described in a patent application to the present inventor. While reducing the present invention to practice, the present inventor has continued to develop and improve the concept of interlocked pellets and surprisingly uncovered that an array composed of interlocked pellets having projections forming a cross shape with varying projection width substantially improves absorption and diffusion of an impact by a projectile and thus provides superior protection.

Thus, according to one aspect of the present invention there is provided an armor system constructed from a plurality of pellets. The pellet is a small, solid or densely packed mass of material having a pellet body attached to (or contiguous with) four projections extending radially outward (and preferably spaced 90° apart around the pellet body). The combination of the pellet body and projections forms a cross shape.

When arranged in an array, each projection of a pellet contacts projections of neighboring pellets in an engagement that is referred to herein as pellet "interlocking". Interlocking does not lock adjacent pellets (against movement) but rather increases a contact area there between (edge surface contact) to enable dissipation of kinetic forces.

Interlocking is designed to allow independent movement of each pellet (in-out, side-to-side, up-down, pitch, roll and/or yaw) while maximizing energy dissipation capabilities of an array formed from such pellets. The distance moved by each pellet can to be several mm to several cm depending on the type of movement, the size of the pellet, and the type of armor incorporating the array.

In contrast to previous configurations described by the present inventor, the projections of the present pellet are asymmetrical in that a width of a first pair of co-linear projections is less than a width of a second pair of co-linear projections. This enables the present pellet to contact more projections of surrounding pellets than previous designs. While previous designs enabled each projection of a cross-shaped pellet to contact three projections of adjacent pellets, for a total of 8 contacts for each pellet, the present design enables the narrower projection of a pellet to contact three projections of adjacent pellets and the wider projection of a pellet to contact four projections of adjacent pellets for a total of 10 contacts (an increase of 21.6% in surface area contact depending on the width and length of the projections). As is illustrated in the Examples section which follows, such increased contact area yielded a surprising and unexpected increase in efficacy. For example, an array constructed from 7.3×6 mm pellets exhibited an increase of around 33% in protection as compared to an array of 6×6 mm pellets.

Dissipation of the kinetic forces of an on-coming projectile is achieved via two mechanisms:

(i) Independent movement of the pellet impacted by the projectile; the pellet will move in (normal force) with movement of projectile and spin (yaw) with the spin of the projectile, such independent movement will dissipate some of the kinetic energy. In cases of body armor which also includes additional layers of materials (ballistic fabrics etc) such movement could be used to transfer energy to such layers.

(ii) 'Collective' movement of the array; due to the large contact area between pellets, projectile impact will be 'conducted' from the impacted pellet to neighboring pellets, thereby dissipating the kinetic force across the array ('ripple effect').

Without being bound to a theory, the increase in contact area improved both of the above parameters due to:

(i) directing the force of the projectile to the weaker arms of the pellet (the shorter arms) thereby delaying the projectile on the surface area rather than transferring the force into the armor plate;

(ii) projectiles spin east to west (counter clockwise), a larger contact area between pellets will improve dissipation of kinetic energy and reduce impact along the trajectory path; and (iii) the asymmetric configuration of the pellet will lead to asymmetric movement following projectile impact and lead to pellet wobble and further dissipation of kinetic energy.

An incoming projectile may contact the pellet array in one of three ways:

(i) Center contact—the impact is absorbed by the pellet and dissipated by independent movement thereof as well as conduction of kinetic energy to neighboring pellets (ripple effect). Since the entire pellet participates in stopping the projectile penetration is not possible without pulverization of the pellet, an energy-intensive task.

(ii) Off center contact—the impact causes projectile tilt (yaw or pitch), thereby dissipating some of the kinetic energy through pellet movement and some through increased projectile contact and friction since a larger frontal area is contacted by the projectile. Such tilting deflects the projectile sideways and allows further dissipation of kinetic energy by other pellets of the array (ripple effect).

(iii) Gap (valley) contact—the projectile jams in the gap between projections. Some of the kinetic force of the impact is translated into a sideward force which is dissipated through the array (ripple effect).

The pellet of the present invention can be fabricated from any material including steel, aluminum, magnesium, titanium, nickel, chromium, iron and/or their alloys as well as glass, graphite and polymers such as silicon-based polymers, elastomeric carbon-based polymers, Dyneema™ Spectra Shield™, a thermoplastic polymer such as polycarbonate, or a thermoset plastic such as epoxy or polyurethane. The pellet is preferably fabricated from a ceramic which includes alumina, boron carbide, boron nitride, silicon carbide, silicon nitride, zirconium oxide, sintered oxide, nitrides, carbides and borides of alumina, magnesium, zirconium, tungsten, molybdenum, titanium, silica, titanium diboride, silicon oxide, magnesium oxide, silicon aluminum oxynitride.

In order to further increase the ability of the pellet and array to withstand projectile impact, a front surface (face) of the pellet can be shaped in order to deflect an oncoming projectile. For example, a front surface of the pellet can be convex (see FIG. 2 for an example) such that a height of the pellet is greatest at the center of the pellet body and tapers down outwardly along the projections. Such surface shaping can further deflect an oncoming projectile and dissipate some of its kinetic energy.

The armor system of the present invention can include the pellet array described herein for deforming and shattering an impacting high velocity projectile and an inner layer adjacent to the pellet array which includes a ballistic material (e.g. Dyneema, Kevlar, aluminum, steel, titanium, or S2) for absorbing remaining kinetic energy from projectile fragments.

Although the pellets of an array can be packed to maximize contact between projections (no gap between projections), in some embodiments, the array can be packed such that a small gap (also referred to herein as valley) remains between projections (e.g. 0.1-4 mm or more depending on the NIJ level of protection desired. The relationship between the valley gap and performance is a function of the threat level to which protection is desired. For example, a larger valley gap may provide superior protection against a projectile with a larger diameter. However, a projectile with a smaller diameter may require a small valley gap. Such a packing configuration can reduce weight and improve dissipation and attenuation of shock waves resulting from projectile impact.

One presently preferred resin is a two-component mixture in which part A is Isocyanate and part B is a Resin which co-solidifies with part A to form a rapid curing elastomeric polyurethane sheet.

Since optimal functionality of the armor system of the present invention requires that pellets have some independent movement, an array of pellets used in such armor system are preferably not secured directly to the plates but rather are secured to a flexible support that is connected to the plates. Such a flexible support can be composed from an elastic mesh (e.g., viscoelastic), a matrix material and/or a bonding material.

A pellet array constructed in accordance with the teachings of the present invention can include any number of pellets of any size depending on the intended use of the array and the surface coverage desired.

For example an array of cross-shaped pellets configured for use in protecting a light vehicle (e.g. Jeep, car), an airplane or a boat can include 18,000 pellets each having a width of 26 mm, a height of 15 mm and a depth (front to back) of 26 mm Such an array can be disposed between a front and back plates constructed from an alloy or woven material. Preferably such a multi-layered armor panel includes an inner layer of a tough woven textile material (e.g. Dyneema™ Spectra Shield™, Kevlar™ a polycarbonate, epoxy or polyurethane) for enabling asymmetric deformation of projectile fragments and for absorbing remaining kinetic energy from such fragments.

An array of cross-shaped pellets configured for use in protecting an individual can include 360 pellets each having a width of 18 mm, a height of 12 mm and a depth of 18 mm Such an array can be disposed between a front and back plates constructed from tough woven textile material, preferably aramid synthetic fibers and polyethylene fibers. Suitable synthetic fibers are commercially available under trade names such as Dyneema™, spectra Shield™ and Kevlar™.

Figure 1:
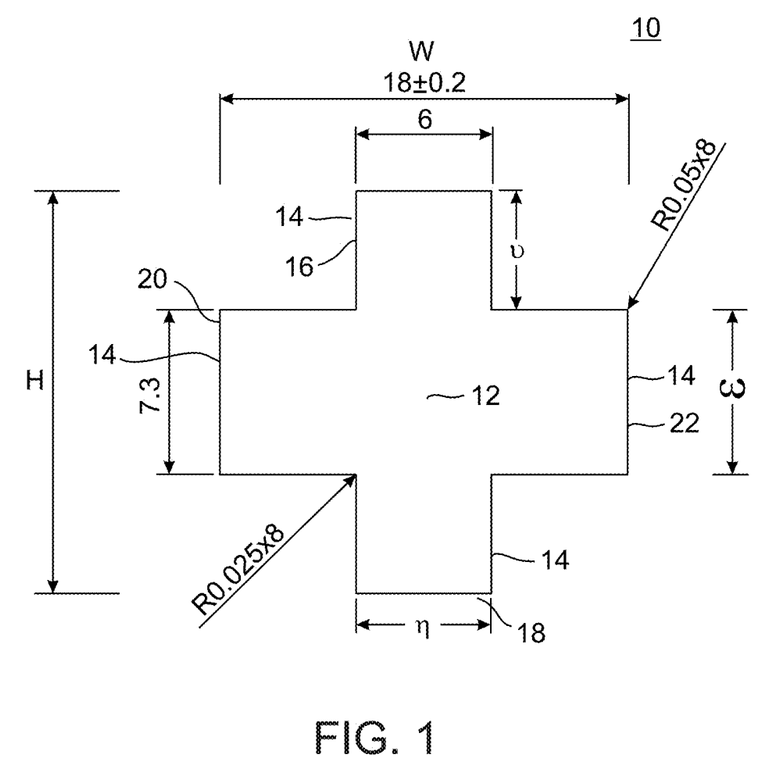
FIGS. 1, 2 and 3 schematically illustrate top (FIG. 1), side (FIG. 2) and isometric (FIG. 3) views of a cross-shaped pellet of the present invention.
Figure 2:
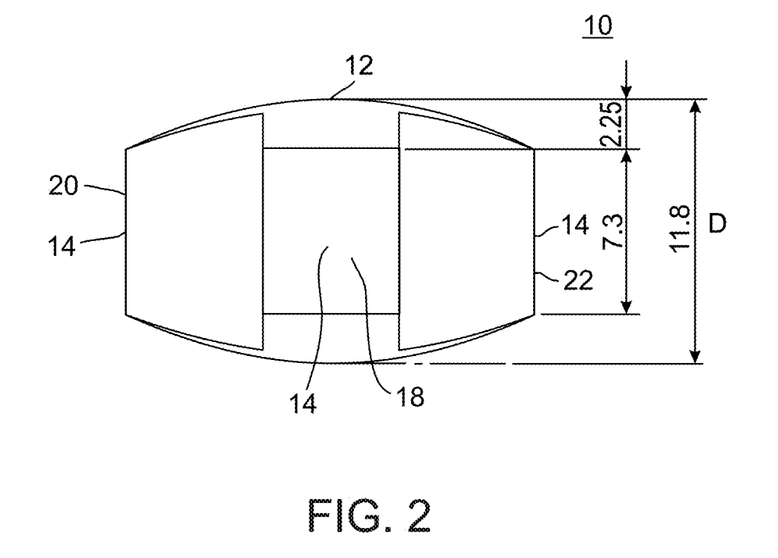
Figure 3:
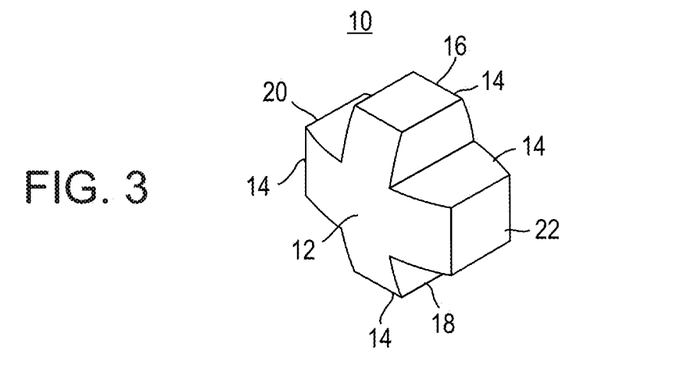
Figure 4:
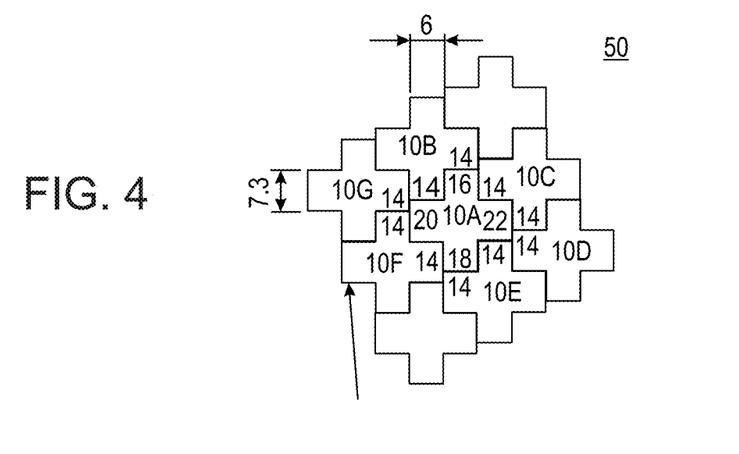
FIGS. 4-5 schematically illustrate top (FIG. 4) and isometric (FIG. 5) views an array formed from the cross-shaped pellet of the present invention.
Figure 5:
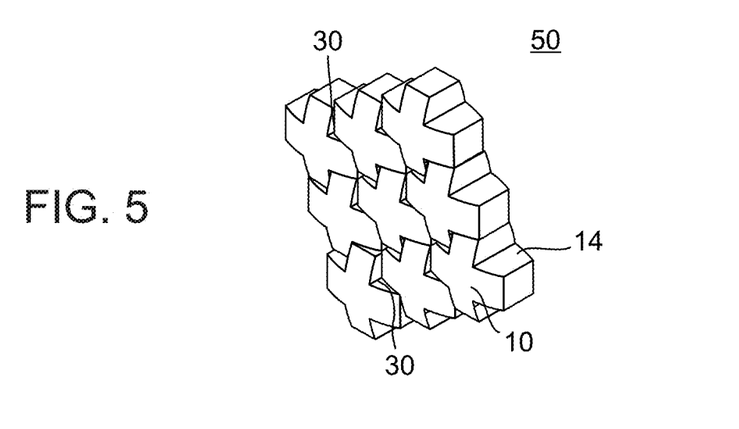
Figure 6:
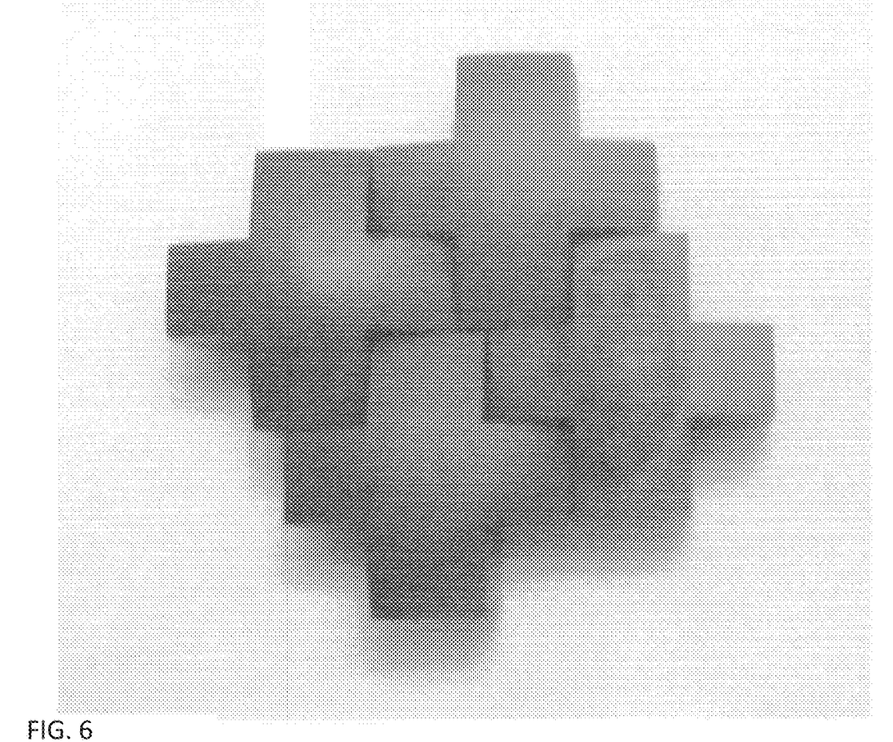
FIG. 6 is an image of an array constructed from ceramic cross-shaped pellets.

Referring now to the drawings, FIGS. 1-3 illustrate the pellet of the present invention which is referred to herein as pellet 10 while FIGS. 4-5 illustrate an array 50 constructed from pellets 10.

Pellet 10 includes a pellet body 12 and four projections 14 forming a cross shape. Co-linear projections 16 and 18 are narrower than co-linear projection 20 and 22. In the Example shown in FIG. 1, co-linear projections 16 and 18 are 6 mm wide, while co-linear projections 20 and 22 are 7.3 mm wide. These dimensions are for illustrative purposes and should not be considered limiting. For example, a pellet 10 in which co-linear projections 16 and 18 are 5.35-6 mm wide and co-linear projections 20 and 22 are 6-7.3 mm wide can also be used to form an array 50 (FIGS. 4-5).

In general, the relationship between projections 16 and 18 and projections 20 and 22 can be expressed by the following formula:

$$w-n=l\times 1/x$$

wherein n represents the width of the narrow projection, i.e. 16 and 18, w represents the width of the wider projection (FIG. 1), i.e. 20 and 22 and l represents the length of projections 14—from body 12 to end). X is selected from a range of 3-6, preferably 4-5.

Pellet body 12 can be solid (as shown in FIGS. 1-3) or it can include one or more holes (preferably a cylindrical through hole) that can optionally house an insert of any shape and size preferably fabricated from a ballistic material (e.g. ceramic).

A front surface of pellets 10 can be flat, or it can be convex as is shown in FIG. 2. An array formed from flat pellets 10 has a flat front face (not shown). As is shown in FIG. 5, an array 50 assembled from convex pellets includes triangular-shaped voids in the front face that are referred to herein as valleys 30. Valleys 30 can have a volume that is less than 25%, 15%, 10%, 5% or 1% of the total volume of pellet 10 and typical dimensions of 18 mm in width (W, FIG. 1), 11.8 mm in height (H FIG. 1) and 18 mm in depth (D, FIG. 2) in a pellet 10 having the dimensions mentioned hereinabove.

Use of convex pellets 10 in an array 50 is presently preferred since it reduces the overall weight of array 50 and provides an array which better able to deflect a projectile due to the fact that convex face is oriented in the direction of impact (FIG. 5). In addition, the present inventors have uncovered that having a valley 30 between 4 adjacent cross-shaped pellets increases array flexibility and attenuates shock wave propagation between front and back plates.

The curvature of outer face 24 of pellet 10 can be continuous over pellet body 12 and projections 14 (as is shown in FIG. 2). Alternatively, the curvature of outer face 24 over center 12 (B) can be different than the curvature of outer face 24 over projections 14 (P). In any case, the curvature can be in the range of 0.1-10 mm (radius of curvature) or more.

A length (or diameter) of pellet 10 as measured from one end of projection 14 to an opposite end of projection 14, for example from projection 16 to 18, can be 14-20 mm (18 mm shown in FIG. 1) and in any case can be less or greater than a height (H) of pellet body 12 at the center (11.8 shown in FIG. 2).

FIGS. 4-5 illustrate an array 50 constructed from pellet 10. As is shown in FIG. 4, projection 16 of pellet 10A contacts three projections 14 of adjacent pellets (pellets 10B-C), while projection 20 of pellet 10A contacts four projections 14 of adjacent pellets (Pellets 10B, F, G). This enables the present pellet design to contact six surrounding pellets (10B-G) through total of 10 projections 14. A cross-shaped pellet of symmetrical design (projections 14 of equal width) would only contact four surrounding pellets through eight projections.

Array 50 can be used in any armor system and in any configuration (e.g. vehicle plates, body vests, helmets etc.). Such an armor system can also include front and back plates sandwiching array 50. A polymer resin can be deposited in spaces between pellets 10 and between array 50 and the plates. The polymer resin can be used as a flexible support structure to hold array 50 against front and/or back plates thus functioning as a force dampening matrix with array 50 being a layer embedded in this matrix.

The plates can be fabricated from an alloy sheet such as titanium alloy or a hard carbon steel. The primary advantage of metals is that they can more easily be fabricated to the required shape and size. The back plate is preferably ultra-light weight and exhibits outstanding out-of-plane stiffness strength. It is designed to have improved bending stiffness and strength for optimizing the armor performance.

The front plate can be fabricated from an aluminum alloy, a magnesium alloy, low carbon steel, medium carbon steel and aluminum having a Rockwell-C hardness of less than 27. This hardness is equivalent to a Rockwell-A hardness of less than 63.8 and a Rockwell-B hardness of less than 100. The softer metals are more ductile, and thus absorb energy over a greater distance when driven by a projectile.

A fabric web can be used to wrap and hold array 50 and plates in place and form an integrated armor kit that can be applied to vehicles or used in a vest.

The armor system can also include fasteners (straps hooks etc) that may extend through the polymer resin so as to provide further support for holding array 50 to front plate and/or back plates.

The armor system of the present invention can also include a high tensile strength fabric that can be attached via glue or fasteners to a back surface of array 50. The fabric may comprise at least one of woven carbon fabric, a layer of fiberglass, aramid fabric, carbon fibers, and/or polymeric threads (e.g. polyester threads and/or ultra high resistance polyethylene). Alternatively, a metal sheet may be adhered to the back surface of array 50.

Any number of array 50 layers can be used in an armor system depending on use and protection sought. For example, a single layer of array 50 can be used in an armored vest, while two or more layers can be used in an armor panel for vehicles.

Fabrication of an armor system is effected by assembling an array of pellets between a first layer made from Dyneema, Kevlar, Aluminum, steel, titanium, or S2 or to any combination thereof and a second layer of similar material. Resin is then poured between the layers and pellets and the entire cured assembly is then covered with a Kevlar or polycarbonate mesh or fabric.

Thus, the present invention provides a pellet and an armor system which includes an array of interlocked pellets.

The armor system of the present invention provides several advantages:
(i) it is lightweight;
(ii) it is characterized by superior ballistic protection which results from effective dissipation of kinetic forces via movement of individual pellets as well as movement of the entire array;
(iii) it is modular and repairable, individual pellets can be replaced/exchanged;
(iv) independent movement of individual pellets provides flexibility and enables use of the armor on contoured surfaces;

(v) it can resist heat and flame due to the use of ceramics; and (vi) it is easy and relatively inexpensive to manufacture and repair.

It is expected that during the life of this patent many relevant ceramic materials will be developed and the scope of the term ceramic is intended to include all such new technologies a priori.

As used herein the term "about" refers to ±10%.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Testing of a Ballistic Armor Comprising Asymmetric Cross-Shaped Pellets

A study was conducted in order to evaluate the ballistics performance of an armor system incorporating the ceramic pellets of the present invention.

Materials and Methods

An armor panel was constructed using a Kevlar outer layer encasing one level of boron carbide pellets arranged in an array of 336 units (dimensions: L-18 mm, W-18 mm, D-11.8 mm) with a back panel of Spectra (10 mm) surrounded by a resin.

The armor panel weighed at 5.38 Lbs per square foot, 15% less than the ESAPI/XSAPI weight objective (6.2 lbs/square foot).

The armor panel was tested at threat level D from 100 yards. A first panel was tested with one round, a second for multi-hit capabilities and third and fourth panels were tested at zero yards.

Results

The results are presented in Table 1 below.

maintains the ESAPI/XSAPI ballistic requirements while providing a 15% reduction in weight.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An armor system pellet comprising a pellet having a pellet body comprised of four projections for interlocking adjacent pellets when arranged in an array, wherein a width of a first pair of co-linear projections is less than a width of a second pair of co-linear projections, and wherein each projection of said second pair of co-linear projections is sized and shaped to contact at least three adjacent pellets when arranged in an array of identical pellets.

2. The armor system pellet of claim 1, wherein each projection of said first pair of co-linear projections having a width which is less than a width of said second pair of co-linear projections is capable of contacting three projections of adjacent pellets when arranged in an array.

3. The armor system pellet of claim 2, wherein each projection of said second pair of co-linear projections having

| Test | Panel type | Weight (PSF) | Weight Panel | Pellet Material | Projectile | Impact velocity | Range | Results | |
|---|---|---|---|---|---|---|---|---|---|
| Test 1 - first shot on panel | 10 × 12.50 inches | 5.88 | 5.36 | B4C boron carbide | 7.62 | 2533 fps | 100 Yards | No penetration | |
| Test 2 - Multi hit capability | 10 × 12.50 | 5.90 | 5.27 | B4C boron carbide | 7.62 | 2045 fps | 100 yards | No penetration | second shot after first shot of threat level-D |
| Test 3 | 11 × 14 | 5.64 | 6.04 | B4C Boron Carbide | 30.6 | 2874 fps | 0 | No penetration | |
| Test 4 | 10 × 12.0 | 6.36 | 5.30 | B4C Boron carbide | 7.62 | 2525 fps | 0 | No penetration | |

PSF—pounds per square foot
fps—feet per second
API—Armor Piercing Incendiary

As is evident from the results presented above, an armor panel including an array of the present pellets effectively stopped Threat level D at 100 yards (ESAPI/XSAPI ballistic requirements), while also exhibiting multi-hit stopping capabilities at the same distance.

Thus, ballistic tests demonstrated that an armor panel constructed from the to pellets of the present invention a width which is larger than a width of said first pair of co-linear projections is capable of contacting four projections of adjacent pellets when arranged in an array.

4. The armor system pellet of claim 1, wherein said pellet is cross-shaped.

5. The armor system pellet of claim 1, being composed of a ceramic material.

6. The armor system pellet of claim 1, wherein said ceramic material includes a material selected from the group consisting of alumina, boron carbide, boron nitride, silicon carbide, silicon nitride, and zirconium oxide.

7. The armor system pellet of claim 1, wherein and/or a back surface of the pellet are convex.

8. The armor system pellet of claim 1, wherein a front and/or a back surface of said projections are convex.

9. The armor system pellet of claim 1, wherein a length or width of the pellet exceeds a largest depth thereof.

10. An armor system comprising an array of pellets, wherein said array is composed of the armor system pellet of claim 1.

11. The armor system of claim 10, further comprising plates sandwiching said array.

12. The armor system of claim 11, further comprising a polymer resin disposed within said array and/or between said array and said plates.

13. The armor system of claim 11, further comprising a flexible support structure for securing said array to said plates.

14. The armor system of claim 13, further comprising connectors for interconnecting said array to said plates through said support structure.

15. The armor system of claim 11, further comprising a shock absorbing layer disposed between said plates.

16. The armor system of claim 10, comprising one or more layers of said array.

17. The armor system of claim 10, further comprising a ensue strength fabric disposed around said array.

18. The armor system of claim 17, wherein said fabric includes carbon fibers, fiberglass fibers, aramid fibers and/or metallic fibers.

19. The armor system of claim 10, incorporated into a body armor.

20. The armor system of claim 10, incorporated into an armor panel of a vehicle, airplane, boat or a structure.

21. The armor system pellet of claim 1, wherein said pellet is sized and shaped so when placed in an array of identical pellets a projection of said first pair from said pellet contacts at least one projection of a second pair from an adjacent pellet.

22. An armor system pellet array, comprising at least 9 pellets, each of said pellets having a pellet body with four projections for interlocking adjacent pellets, wherein a width of a first pair of co-linear projections is less than a width of a second pair of co-linear projections, and wherein each projection of said co-linear projections of said second pair is sized and shaped to contact at least three adjacent identical pellets.

23. The array of claim 22, wherein a back surface of said pellet is convex to allow independent movement of said pellet in response to a projectile impact in a front surface of said pellet.

24. The array of claim 23, wherein said independent movement of said pellet comprises yaw movement.

25. An armor system pellet array comprising at least 9 pellets, each of said pellets having a pellet body with four projections for interlocking adjacent pellets, wherein a width of a first pair of co-linear projections is less than a width of a second pair of co-linear projections, and wherein each projection of said co-linear projections of said second pair is sized and shaped to contact at least 4 projections.

26. The armor system pellet array of claim 25, wherein a bottom surface of said array is wavy.

27. The armor system pellet of claim 1, wherein a back surface of said pellet is convex to allow independent movement of said pellet in response to a projectile impact in a front surface of said pellet.

28. The armor system pellet of claim 27, wherein said independent movement of said pellet comprises yaw movement.

29. An armor system cross-shaped pellet comprising a pellet having a pellet body comprised of four projections for interlocking adjacent pellets when arranged in an array of identical pellets, wherein a width of a first pair of co-linear projections is less than a width of a second pair of co-linear projections.

30. An armor system pellet comprising a pellet having a pellet body comprised of four projections for interlocking adjacent pellets when arranged in an array, wherein some projections of said four projections are sized and shaped to contact at least three adjacent pellets when arranged in a planar array of identical pellets.

31. An armor system pellet array comprising at least 9 pellets, each of said pellets having a pellet body with a convex hack surface to allow independent movement of said pellet in response to a projectile impact in a front surface of said pellet, and with four projections for interlocking adjacent pellets, wherein a width of a first pair of co-linear projections is less than a width of a second pair of co-linear projections, and wherein each projection of said co-linear projections of said second pair is sized and shaped to contact at least 4 projections.

* * * * *